Sept. 18, 1956  R. LECOQ  2,763,296
MACHINE FOR JOINING WIRE PORTIONS OF SPRINGS
PARTICULARLY THOSE OF GENERALLY HELICOIDAL
SHAPE USED IN BOX MATTRESSES, SEAT CUSHIONS
AND LIKE FURNITURE APPLIANCES
Filed March 30, 1953  12 Sheets-Sheet 1

ROBERT LECOQ
By
Holcombe Wetherill & Brisebois

Sept. 18, 1956  R. LECOQ  2,763,296
MACHINE FOR JOINING WIRE PORTIONS OF SPRINGS
PARTICULARLY THOSE OF GENERALLY HELICOIDAL
SHAPE USED IN BOX MATTRESSES, SEAT CUSHIONS
AND LIKE FURNITURE APPLIANCES
Filed March 30, 1953  12 Sheets-Sheet 7

FIG. 14

ROBERT LECOQ
By
Holcombe Wetherill & Brisebois

Sept. 18, 1956 R. LECOQ 2,763,296
MACHINE FOR JOINING WIRE PORTIONS OF SPRINGS
PARTICULARLY THOSE OF GENERALLY HELICOIDAL
SHAPE USED IN BOX MATTRESSES, SEAT CUSHIONS
AND LIKE FURNITURE APPLIANCES
Filed March 30, 1953 12 Sheets-Sheet 9

ROBERT LECOQ
By
Holcombe Wetherill & Brisebois

ROBERT LECOQ

Sept. 18, 1956　　　　R. LECOQ　　　　2,763,296
MACHINE FOR JOINING WIRE PORTIONS OF SPRINGS
PARTICULARLY THOSE OF GENERALLY HELICOIDAL
SHAPE USED IN BOX MATTRESSES, SEAT CUSHIONS
AND LIKE FURNITURE APPLIANCES Filed March 30, 1953　　　　12 Sheets-Sheet 11

ROBERT LECOQ

Sept. 18, 1956  R. LECOQ  2,763,296
MACHINE FOR JOINING WIRE PORTIONS OF SPRINGS
PARTICULARLY THOSE OF GENERALLY HELICOIDAL
SHAPE USED IN BOX MATTRESSES, SEAT CUSHIONS
AND LIKE FURNITURE APPLIANCES
Filed March 30, 1953  12 Sheets-Sheet 12

ROBERT LECOQ

United States Patent Office 2,763,296
Patented Sept. 18, 1956

2,763,296

MACHINE FOR JOINING WIRE PORTIONS OF SPRINGS PARTICULARLY THOSE OF GENERALLY HELICOIDAL SHAPE USED IN BOX MATTRESSES, SEAT CUSHIONS AND LIKE FURNITURE APPLIANCES

Robert Lecoq, Paris, France

Application March 30, 1953, Serial No. 345,534

Claims priority, application France April 4, 1952

6 Claims. (Cl. 140—3)

The present invention has for its object a machine using wire for fastening together springs used in furniture appliances, for instance in the manufacture of spring mattresses for beds and spring cushions for seats. The machine according to the invention is capable of winding and tightening the fastening wire over the end loops of two springs in the region where said end loops are in tangential relation.

The spring fastening machine according to the invention is characterized by the fact that it comprises in combination: two rotatable coaxial cylindrical members of substantially same size; means for supporting said members; and a driving device adapted to cause said members to simultaneously rotate equal angles in opposed direction.

Said rotatable cylindrical members—hereinafter designated as "rollers" by way of simplification of wording— are each provided with a radial slot open at their periphery and extending at the other end beyond the geometrical axis of said members or rollers. Each of said rollers is also provided with a transverse passage or conduit inclined on said axis, and, when said radial slots are facing each other, said supporting means leave said slots entirely open, and a straight piece of wire may be introduced through said passages, so that it extends through said rollers at the proximity of said axis. Similarly, the portions of respective end loops of two helical springs intended to be fastened together may be disposed at the bottom of said radial slots and, when rotating the rollers and maintaining the loops in stationary position, said straight piece of wire is being wound up over said loops and tightly fastens them against each other; the mutual fastening of said spring loops is thereby obtained, and it is only necessary to bring the radial slots opposite each other to be able to remove the springs from the machine.

It is also among the objects of the present invention to provide a spring fastening machine of the above described type which comprises, in combination with said rollers and associated supporting and driving means, a device for automatically feeding a fastening wire from a source of supply and introducing a straight portion of said fastening wire into the said passages provided in said rollers when the latter are stationary, and another device for severing the wire at a predetermined length before said rollers be driven in motion by said driving device.

Furthermore, according to the invention, the said fastening machine may also independently or in combination embody the following features:

(1) A single motor is adapted to drive a main shaft by means of a clutching device placed under the control of an operator, the rotation of said main shaft controlling at the proper sequence the several devices for feeding and severing the fastening wire and for driving said rollers;

(2) A device for automatically disconnecting the transmission of motion after the completion of each cycle of operations necessary for an elementary industrial result such as the mutual fastening of two spring loops;

(3) Means for causing the machine to come to a stop at the end of an operating cycle and after the machine has been disconnected, so that said machine is exactly in such a position that the slots of the rollers and the passages extending therethrough are in the same alignment;

(4) The automatic feeding device comprises means for adjusting the length of said severed portion of wire to the value appropriate for a suitable mutual fastening of the loops of two springs of a predetermined given size;

(5) The machine comprises an upper table enclosing the rotating rollers thereof and affording a bearing surface for the spring loops to be fastened in order to facilitate the adequate and rapid positioning of said loops at the inner bottom of the radial slots of said rollers.

Whatever the constructional details of the machine may be, the latter is, according to the invention, essentially adapted for not only rapidly fastening two end loops of springs together but also performing a similar operation on a spring loop and a wire which may be placed in the bottom of the radial slots of the rollers without interfering with the rotary motion imparted to the latter. Elastic frames may thus be provided which simultaneously comprise mutually fastened contiguous springs as well as noncontiguous springs joined together by means of a connecting wire separately fastened to both said noncontiguous springs, respectively.

The machine according to the invention provides a fastening better than all others already known from the following stand-points: strength, manufacturing cost, as well as comfort of the user. It is a fact that a perfect tightening of the spring loops one against the other is thereby obtained, which tightening absolutely prevents any creaking caused by a deformation of the springs in service, and, moreover, a relatively cheap iron fastening wire may be utilized which is severed in lengths of suitable size without any loss of material.

It is another object of the invention to provide an elastic frame produced by means of the machine according to the invention that is to say by separately fastening the end loops of a pair of springs together at the place where said loops are in tangential relation and, eventually, also fastening the end loops of said springs to wires tangentially disposed with regard to loops of a group of springs so that said group of springs constitutes a single unit. The elastic frame according to the invention is characterized by the fact that the fastening of the springs with each other, and, eventually, with a connecting wire, is obtained by means of several coils of of a wire tightened without play over the terminal loops of said springs, and, eventually, over said loops and connecting wires.

An elastic frame according to the invention may be manufactured rapidly and at a relatively low cost. When desired, the springs may be disposed in further spaced rows, a disposition which further reduces the manufacturing cost; the result is, however, a product of quality, which may be utilized in the manufacture of comfortable and durable cushions and like flexible elements, owing to the fact that the springs perfectly perform the mutual cooperating action they are intended for on account of the strength of their fastening means which prevent the occurrence of any possible play between said springs.

These and other features and advantages of the present invention will appear in the following description of a number of embodiments of same, given solely by way of non limitative examples, in reference to the appended drawings, in which.

On the various views of the drawings, the same references designate elements and parts having the same function.

The fastening machine according to the invention shown in the drawings essentially comprises (Fig. 1) two coaxial rotary members shown herein in the form of two straight pinions 1 and 2 of equal diameter and width, each having one radial slot, 3 and 4, respectively, open at the outer periphery and extending at the other end beyond the geometrical axis thereof; radial slots 3 and 4 are identical and adapted to be placed on the same alignment along a direction parallel to the axis of pinions 1 and 2.

Figure 1:
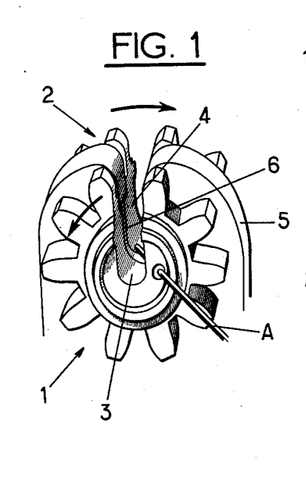
Figure 1 is a partial perspective view of the rotating members which wind up and tighten the fastening wire in a machine according to the invention.

The pinions 1 and 2 are rotatably mounted in a stationary support comprising lateral flanges (not shown) and a median plate or similar member 5 formed with cylindrical recesses providing bearing means for corresponding trunnions on pinions 1 and 2.

Through each of said pinions 1 and 2 is provided a straight hole, passage or the like, inclined on the common pinion axis; said passages are on the same alignment along a straight line substantially cutting the geometrical axis of the pinions 1 and 2, when the slots 3 and 4 themselves are in alignment. When said passages and slots occupy the latter relative positions, a rectilinear wire A may be passed through the pinions 1 and 2, since the plate 5 itself is provided with a slot 6, the cross-section of which through a plane perpendicular to the axis of pinions 1 and 2 is identical to the cross-section of slots 3 and 4, and, on the other hand, suitable recesses or cut-away portions have been provided in said lateral flanges of said stationary support so that the whole radial slot 3—6—4 formed by the superimposed slots 3, 6 and 4 are then left entirely free of any obstruction.

Figure 2:
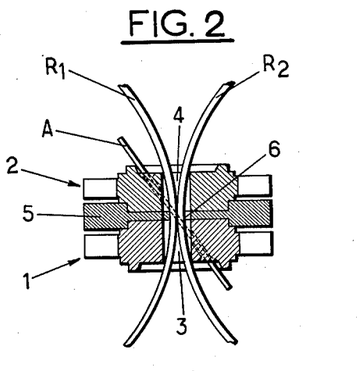
Figure 2 is a horizontal axial section of the members shown in Figure 1 and also showing a portion of spring loops on the machine in a position enabling the fastening operation to be performed.
Figure 3:
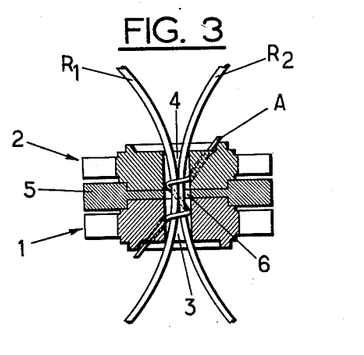
Figure 3 is a view similar to Figure 2, wherein the several parts are shown in the relative positions they occupy after they have rotated a half-turn.
Figure 4:
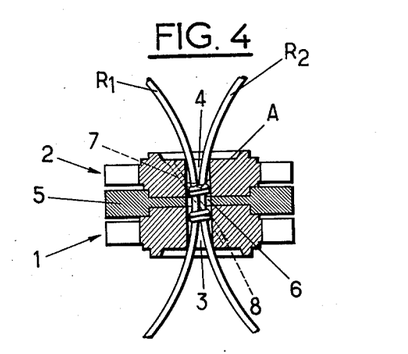
Figure 4 is a view similar to Figures 2 and 3, wherein the several parts are shown in the relative positions they occupy when the winding of fastening wire is completed.

In Figures 1 and 2, the pinions 1 and 2 occupy a relative position wherein the slots 3 and 4 are in alignment, i. e. opposite the slot 6 in the stationary plate 5; the pinions 1 and 2 being then at a standstill, it is possible to introduce a fastening wire A through the transverse passages in the said pinions, and, contiguously to said wire, the lower loop of two springs R₁ and R₂ to be fastened together. To fasten the parts together, it is only necessary, according to the invention, to cause the pinions 1 and 2 to simultaneously rotate in opposite directions as indicated by heavy arrows in Figure 1. Figure 3 shows the position occupied by the wire A after the pinions 1 and 2 have been rotated a half-turn from their starting position. Figure 4 shows the position of the wire A when the winding of the same is completed, each of said pinions having then completed two revolutions. Such number of turns of the wire A is only given by way of example, since, when using a fastening wire of greater length, the pinions 1 and 2 may be rotated more than two turns, but always a whole number of turns. Accordingly, whatever such whole number of turns necessary to suitably complete the winding of the fastening wire A may be, by the end of the winding operation, said pinions are so relatively positioned that their slots 3 and 4 are in alignment with the slot 6 and, when the springs R₁ and R₂ have thus been fastened together, they may be removed from the machine by causing them to slide out of the then entirely open slot 3—6—4. The passages 7 and 8 adapted to slidingly receive the portion A of fastening wire are shown in dashed lines in Figure 4.

Figure 5:
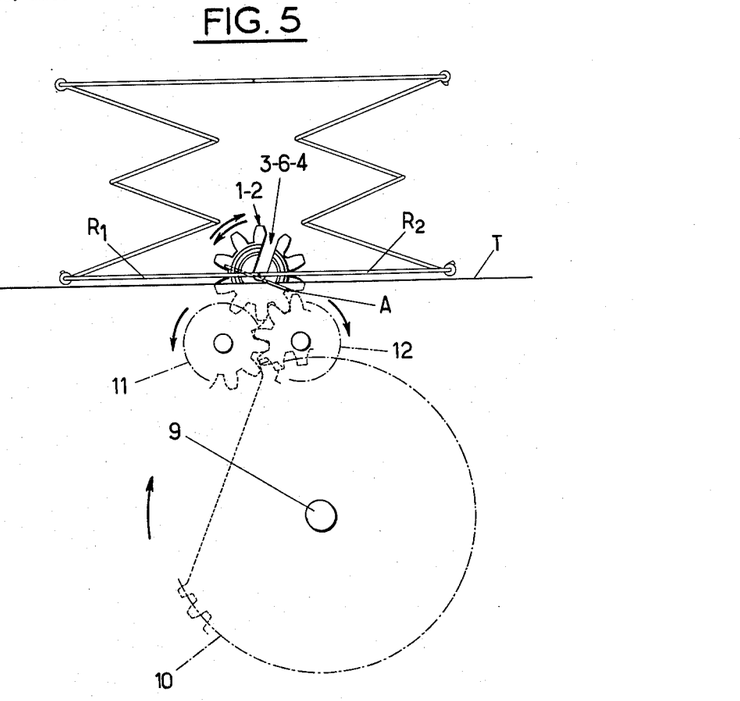
Figure 5 is a diagrammatic front view of a fastening machine showing two springs ready to be fastened by the same.
Figure 6:
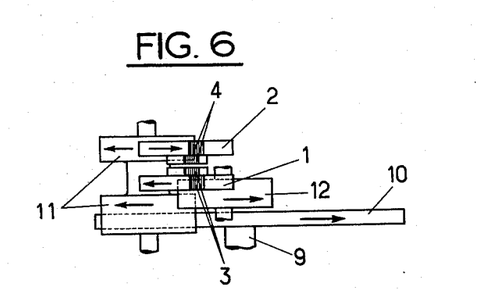
Figure 6 is a diagrammatic plan view corresponding to Figure 5 showing the rotating members and the driving means thereof.

Figures 5 and 6 diagrammatically illustrate a simple mechanism adapted to drive the pinions 1 and 2 in opposite directions at equal speeds. The driving motion is obtained from a main shaft 9 adapted to drive a toothed wheel or gear 10, a portion of the periphery of which is without teeth, said gear 10 being itself in engagement with a double pinion 11. Said double pinion 11 is, on one side, in engagement with a pinion 12, which drives the pinion 1, and, on the other side, in engagement with the pinion 2 for directly driving the latter. Since, on the one hand, the pinions 1 and 2 have an equal pitch circle and, on the other hand, the pinions 11 and 12 have also an equal pitch circle, the pinions 1 and 2 are, accordingly, driven in opposite directions but at the same speed when the pinion 10 is rotating in engagement with the pinion 11. For instance, in the course of one revolution of pinion 10, the pinions 1 and 2 will complete—say—three revolutions; thereafter, the motion will come to a stop when one end of the normal, i. e. toothed, portion of said pinion 10 will become disengaged from the teeth of pinion 11. Such stationary phase of the operating cycle is provided to correspond with the aligned relative position of the combined slot 3—6—4, and to obtain the proper timing of such stop in the motion it is only necessary that the driving direction and angular mounting position of said pinion 10 with regard to said main shaft 9 be suitably chosen.

For the sake of clearness, the support for the driving mechanism is not shown in Figures 5 and 6 of the drawings. Said support may be secured on a table, the upper face of which is designated by T; such table facilitates the positioning of springs R1 and R2 to be fastened together as well as the handling of an assembly comprising a number of already fastened springs.

Figures 7, 8:
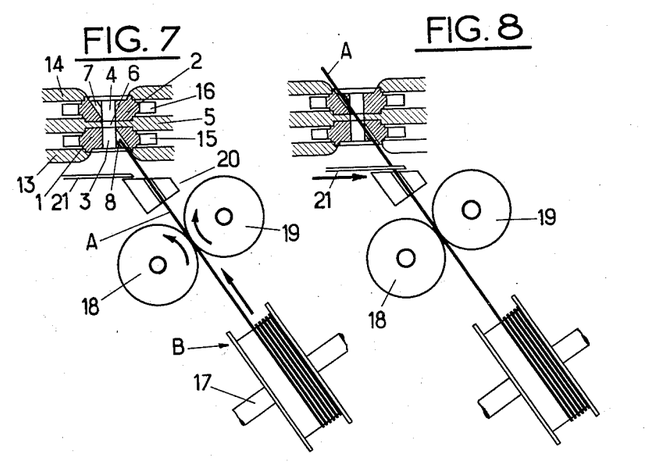
Figures 7–10 are horizontal sections and partial plan views diagrammatically showing the relative positions of the main elements of a fastening machine according to the invention, in the course of a fastening operation.
Figures 9, 10:
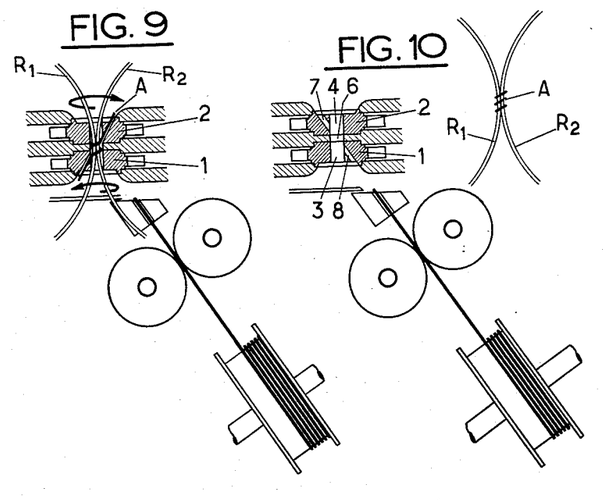

The fastening machine hereinafter described in a more detailed manner, as illustrated in Figures 7, 8 and 10, comprises two coaxial rotary members 1 and 2 which are for convenience sake, hereinafter called "rollers." The rollers 1 and 2, having the same effective diameter, are each provided with a radial slot, 3 and 4, respectively, open at the periphery of the rollers and, at the other end, extending beyond the common geometrical axis of said rollers. 5 is an intermediary plate, between the rollers 1 and 2, which acts as a bracing and bearing member for a cylindrical journal portion on said rollers; plate 5 is formed with a slot 6 having the same size as the slots 3 and 4. The slot 6 is so positioned as to be in alignment with slots 3 and 4 when the latter, of same size, arrive respectively in positions exactly opposite each other.

The rollers 1 and 2 are further supported by plates 13 and 14 formed with cylindrical recesses in order to act as bearing members, the rollers 1 and 2 are peripherally provided with teeth 15 and 16 forming gears of the straight tooth type, the slots 3 and 4 being located between two consecutive teeth in each respective gear.

Rectilinear passages 7 and 8, inclined on the axis of the rollers are provided through said rollers 2 and 1, respectively. When the slots 3 and 4 are in alignment with the slot 6, the axes of said passages 7 and 8 extend along a straight line which intersects the geometrical axis of the rollers 1 and 2; owing to such relative positions, a rectilinear piece of wire A may then be passed through the rollers 1 and 2 when the latter are at a standstill. The wire A is supplied from a wire reel B rotatably and removably mounted on a shaft 17; the wire A may be cyclically driven by rotary followers 18 and 19; said wire A goes through a guiding device 20 along which may slide a cutting blade 21 which has for its function to sever the wire A when the latter, having progressed a suitable length, passes through the rollers 1 and 2. If the rollers 1 and 2 are supposed to be at a standstill, the heavy arrows in Figure 7 show the direction of rotation of the followers 18 and 19 and the direction of progress of the wire A. When the wire A has completed its progress, the said followers 18 and 19 cease from rotating and the blade 21 moves in the direction shown by the heavy arrow of Figure 8 and severs the wire A in the course of that motion. The blade 21 comes back to its starting position (Figure 9). If two end loops R1 and R2 pertaining to two furniture or similar helicoidal springs are then positioned in the machine as already described, and if the rollers 1 and 2 are caused to rotate in opposite directions, as shown by the heavy arrows in the drawings, to simultaneously travel equal angles in order to rotate a whole number of revolutions over said loops R1 and R2, the rollers 1 and 2 subsequently come back to their initial position (Figure 10), wherein exactly the slots 3 and 4 face the slot 6 and the passages 8 and 7, respectively, are in alignment. The loops R1 and R2 may then be removed from the slots in the rollers. The same operating cycle may be duplicated after introducing the opposite end loops of the same springs into the slots of the rollers 1 and 2, and following the already described sequence of operation. Said springs will be then mutually fastened at both ends by means of a wire wound up and tightened over the end loops of said springs, said loops being in tangential relation with each other.

Figure 11:
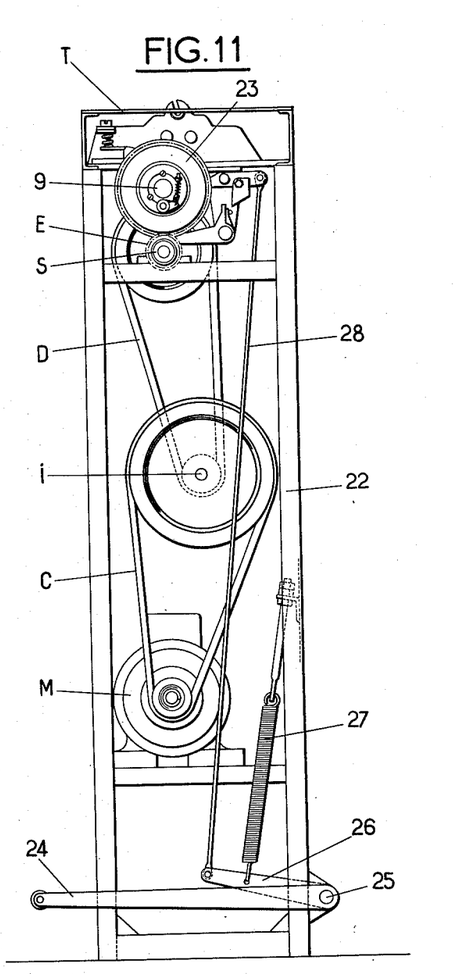
Figure 11 is a general side view of a fastening machine.

In the embodiment herein described, the spring fastening machine according to the invention comprises a metallic supporting frame 22 (Figure 11) carrying a motor M (for instance, an electrical motor), the pulley of which, by means of a belt C, drives another pulley of greater diameter and mounted on an intermediary shaft I. Said intermediary shaft I further carries a small pulley carrying a belt D which is also carried by a pulley of greater diameter mounted on an upper shaft S. A gear E, keyed on the shaft S, is in engagement with another gear 23 the hub of which is carried by a main shaft 9 through a clutching device which will be described hereinafter. Such clutching device is so designed as to operate the machine in synchronism with the predetermined sequence or cycle of the operations which cooperate in the fastening of two springs loops. The sole function of all elements of transmission operatively placed between the motor M and the gear 23 is to provide the rotation of said gear 23 at a speed which corresponds to the normal operation of the machine; accordingly, those elements of transmission may be replaced by any motion transmitting device capable of running the machine at such suitable speed.

A pedal 24 (Figure 11), pivoted about a shaft 25 on the supporting frame 22, controls the clutching engagement of the main shaft 9; 26 is a lever integral with the pedal 24; 27 is a return or biasing spring for drawing back the lever 26 and, therefore, the pedal 24, said spring 27 being hooked up, at one end, on the frame 22 and, at the other end, on the lever 26; 28 is a rod pivoted on lever 26 for controlling the clutching engagement of the main shaft 9. T is a table fixedly secured to the frame 22 by any suitable means, said table providing a support for the springs to be assembled and also facilitating the handling of already assembled springs utilized in the manufacture of an elastic frame (for a box mattress, a cushion, for instance).

Figure 12:
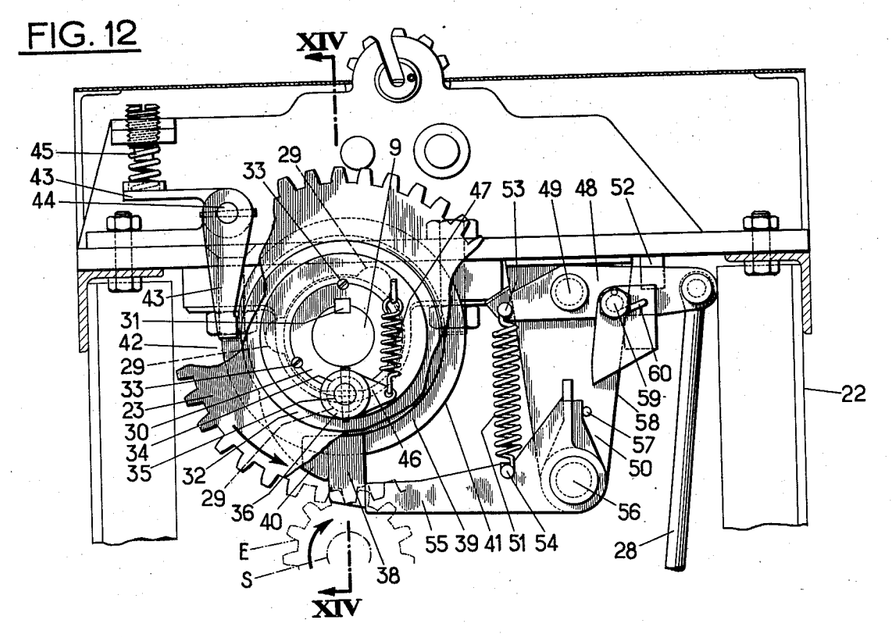
Figure 12 is a partial detailed view, at a larger scale, of the machine of Figure 11, with partial sections and cut-aways, showing the controlling device for the main shaft when said shaft has been disconnected.

The device provided for transmitting motion between the gear wheel 23 and the main shaft 9 is hereinafter described with reference to Figures 12, 13 and 14. The main shaft 9 is carried by bearings 119—120 fixedly secured to the frame 22. The gear wheel 23 is formed with equally spaced identical semi-cylindrical inner grooves 29. Said wheel 23 is so mounted on a sleeve 30, made integral with the shaft 9 by a key 31, that said wheel 23 may freely rotate about said sleeve. 32 is a circular collar secured by screws 33 to the sleeve 30. The outer periphery of sleeve 30 is formed with a semi-cylindrical recess for receiving a similarly semi-cylindrical key 34 extending at one end into a cylindrical end portion 35 upon which a ring 36 is fixedly secured by a cotter pin 37; at its opposite end, said key 34 comprises a cylindrical portion extending into a radial arm 38. On the side opposite to the collar 32, a cylindrical flange 39 with a nose 40 (which may have been added, for instance by welding) is integral with the sleeve 30; furthermore, a cam 41 is secured to the sleeve 30, said cam providing an abutting surface 42 for a lever 43 both arms of which are connected by a shaft 44 pivoting in a support 121 of the frame of the machine; a spring 45 constantly pushes one of said arms in order to urge the other arm against the cam 41.

Figure 13:
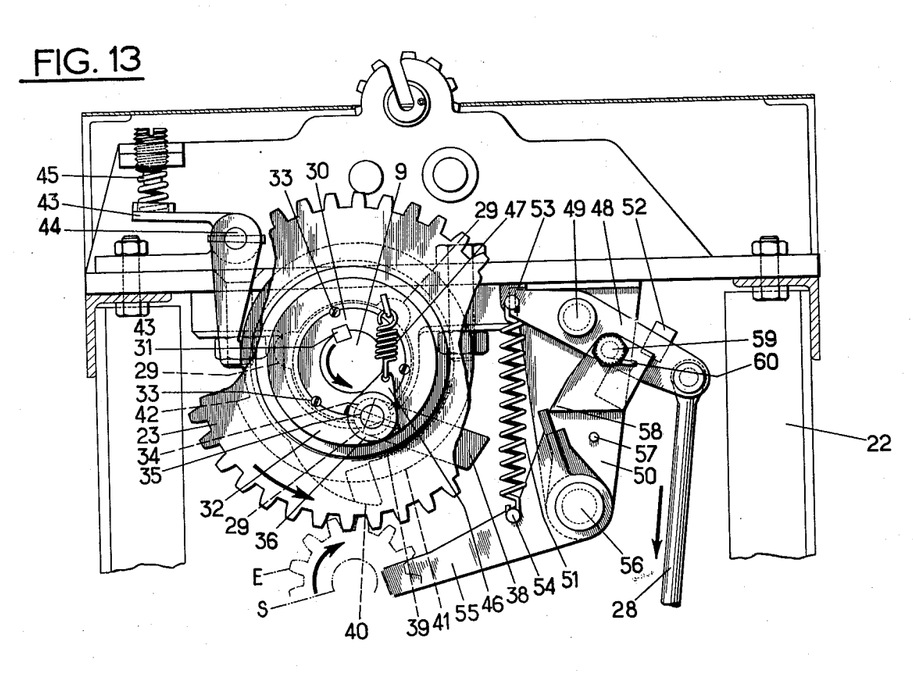
Figure 13 is a view corresponding to Figure 12 showing the relative positions of the parts after the main shaft has been connected.
Figure 14:
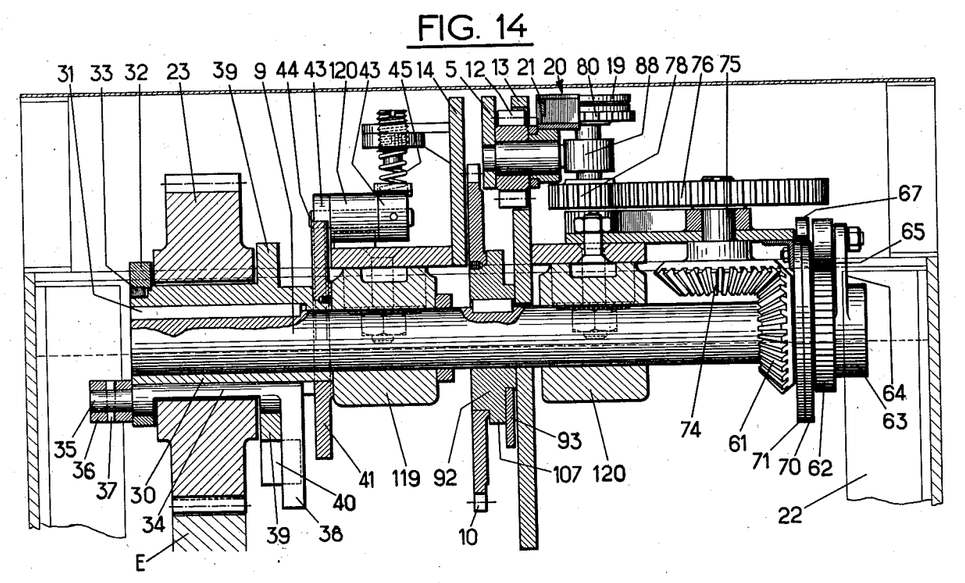
Figure 14 is a view, with partial section through line XIV—XIV of Figure 12.
Figure 15:
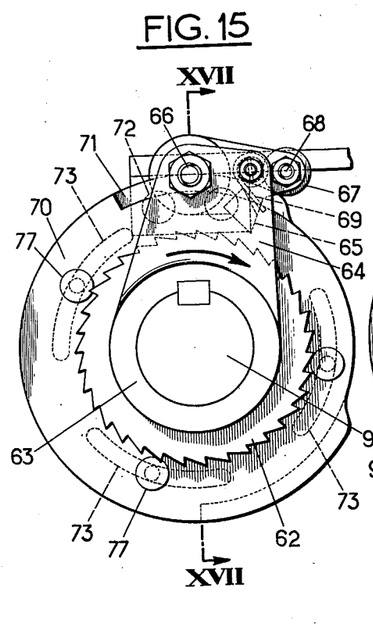
Figure 15 is an end view showing, at a larger scale, details of the wire feeding device, before the latter enter into action.
Figures 16, 17:
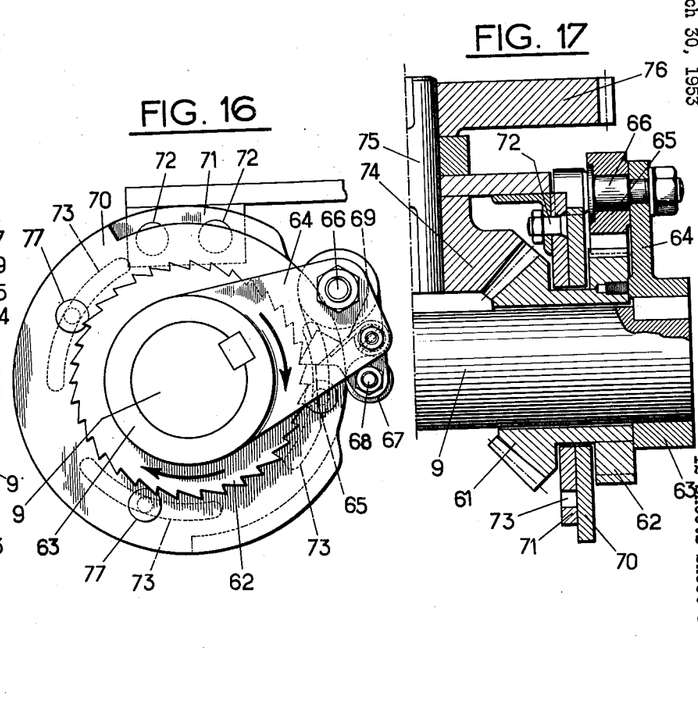
Figure 16 is a view similar to Figure 15, but showing the parts in the relative positions during the progress of the fastening wire.
Figure 17 is a vertical axial section through line XVII—XVII of Figure 15.
Figure 18:
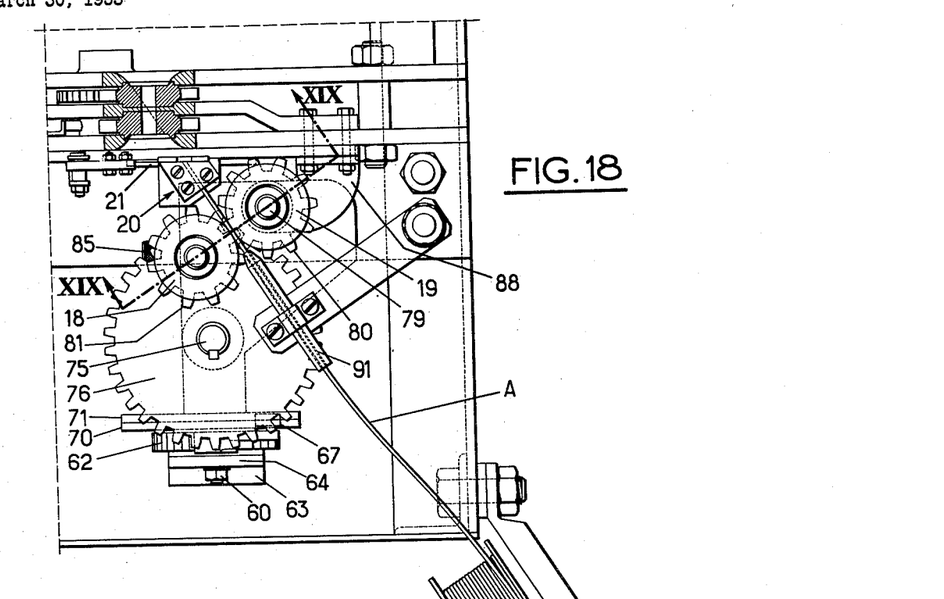
Figure 18 is a partial plan view, at a larger scale, of a portion of the same machine, showing the device for feeding the fastening wire to the machine.

The ring 36 secured to the key 34 comprises a lug 46 to which is hooked up a spring 47 the other end of which is attached to the ring 32; said spring 47 urges the key 34 into a radial position wherein said key projects outside the cylindrical body portion of sleeve 30 and may enter into one of the inner grooves 29 of the wheel 23, when one of said grooves is in a suitable position (as shown in Figure 13).

At its upper end, the rod 28 is pivoted to a lever 48 pivoted itself to a shaft 49 carried by a support 50. When the main shaft 9 (Figure 12) is out of engagement, the lever 48 is urged by a spring 51 and thereby caused to bear against the frame 22 through an abutment 52. At one of its ends, the spring 51 is hooked to the lever 48 through a stub 53, and, at the other end, to a stub 54 carried on a bell crank lever 55 pivoted about a shaft 56 integral with the support 50. 57 is an abutting stud for limiting the swinging motion of the lever 55 caused by the action of the spring 51. A pawl 58 is pivoted to a shaft 59 mounted on the lever 48 and held in place by a nut; said pawl 58 is yieldingly maintained in a suitable position by a spring 60 wound up around the shaft 59 and the ends of which are respectively hooked or otherwise secured in the pawl 58 and in the head of the shaft 59.

When the shaft 9 is disconnected from the wheel 23 (Figure 12), a substantially horizontal arm of the lever 55 comes in abutment with the radially extending arm 38 of the key 34, thereby holding the latter against the nose 40 of the cylindrical flange 39; in such a position, the semi-cylindrical body member of the key 34 is entirely embedded within the sleeve 30, and, consequently, the wheel 23 may freely rotate about said sleeve 30, for instance in the direction shown by the arrow, when the motor M is running.

To obtain the mutual engagement of the main shaft 9 and the wheel 23 (Figure 13), the operator presses with the foot on the pedal 24, thereby causing the rod 28 to move down to reach a lower position limited by the action of the lever 48 which, during its swinging motion, comes in abutment against a corresponding surface of the frame 22. Owing to said swinging motion of said lever 48, the nose of pawl 58 pushes a substantially vertical arm of the lever 55; the latter is thereby caused to rotate about its shaft 56, thus releasing the radially extending arm 38 secured to the shaft of the key 34; the spring 47 contracts and causes the key 34 to rotate as soon as one of the grooves 29 passes in front of the key 34. As soon as the key 34 is engaged into one groove 29, the shaft 9 is driven into rotation by means of the sleeve 30. The operator may then release the pedal 24. The springs 27 and 51 cause the rod 28 and the lever 55 to return to their former position; the lever 55 comes in abutment against the outer surface of the nose 40 and slides along the periphery of the cylindrical flange 39 which rotates with the main shaft 9; the shaft 9 continues to rotate until the outer end of the substantially horizontal arm of the lever 55 meets with the radial arm 38, thereby causing said arm 38 to swing, and, consequently, the key 34 to disappear into its recess within the sleeve 30. From now on, the wheel 23 freely rotates about the sleeve 30 and, therefore, does not drive said sleeve with it. In the course of one revolution of the shaft 9, one entire sequence or complete cycle of the operations necessary for executing one fastening is accomplished, as it will be described hereinafter. However, since the shaft 9 is no longer driven by the wheel 23, said shaft has a tendency to rotate in the reverse direction, under the action of the spring 47, but such motion is prevented on account of the fact that the lower end of the lever 43, after having slid against cam 41 comes in abutment against the shoulder 42 on said cam. For resuming every new fastening cycle, it is necessary to press on the pedal 24 and, then, to release said pedal.

The device for feeding the fastening wire is described hereinafter with reference to Figures 14 to 20.

Said wire feeding device comprises one bevel gear 61 made integral with a ratchet wheel 62 and loosely mounted at one end of the main shaft 9 where it is held in place by means of a keyed sleeve 63; said sleeve 63 extends into an arm 64 upon which is mounted a pawl 65 pivoting about a shaft 66; said pawl 65 carries a follower 67 loosely rotatable about a shaft 68; a spring 69, secured to the arm 64, urges the pawl 65 against the teeth of a gear wheel 62. 70 and 71 are two disc-shaped cams the central opening of which offers a free passage to the cylindrical hub or end portion of the bevel gear 61; the cam 71 is fixedly secured to the machine frame by means of countersunk-headed bolts 77 and the rods of said bolts extend through circularly oblong recesses 73 provided in said cam 71 for enabling a modification of the position of the cam 70 relatively to the cam 71. The bevel gear 61 is in driving engagement with a second bevel gear 74 keyed on shaft 75, a horizontally disposed gear wheel 76 being also keyed on said shaft 75.

Figure 19:
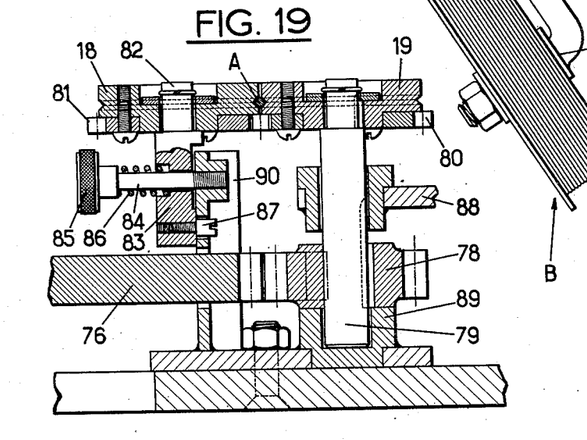
Figure 19 shows, at a larger scale, a partial cross-section through line XIX—XIX of Figure 18.

The wheel 76 is in driving engagement with a spur pinion 78 keyed on a spindle 79 secured to the follower 19; said follower 19 carries a toothed crown 80 in driving engagement with a second toothed crown 81 secured to the follower 18 which cooperates with the follower 19 for the feeding progress of the wire A (see Figure 19). The spindle 82 of the follower 18 is a portion of a support 83 mounted on a portion 90 of the machine frame by means of a thumb-screw 84 with knurled head 85, a spring 86 and a guiding rod 87 screwed in said support 83, the head of said rod 87 being slidingly engaged in a recess of the machine frame. The fastening wire A may thus be yieldingly pressed between the followers 18 and 19 under a force which may be adjusted by screwing or unscrewing the screw 84 by means of the knurled head 85 thereof. 88 and 89 are the supports for the shaft 79. The wire A delivered by a reel B is directed towards the gap existing between the followers 18 and 19 by a tubular guide 91 fixedly secured by any suitable means to the machine frame; when leaving the followers 18—19, the wire A goes through the aforesaid guiding device 20 (Figure 7) associated with the device operating the severing blade 21.

As soon as, by releasing the pedal 24, the shaft 9 has been driven into rotation, said shaft 9 drives the sleeve 63 and together with the arm 64 of said sleeve. At that time, the follower 67 is located by the outer end of the operating portion of the cam 71 (Figure 15) having the greatest effective radius, and, thereafter, said follower 67 falls along the cam portion common to the cams 71 and 70 which has a smaller effective radius. The pawl 65 comes into engagement with a tooth of the wheel 62 and the latter is thereby driven until the follower 67 climbs on the portion of the cam 70 having the greatest radius. As already explained, the relative position of the cams 70 and 71 may be modified, and, consequently, it is possible to modify the angle, and, therefore, the duration of the rotation of the wheel 62 and of the pinion 61 secured thereto. Motion is then transmitted from the bevel gear 61 to the bevel gear 74 and the wheel 76, and, from the latter, to the pinion 78, and, through the shaft 79, to the follower 19 the toothed portion 80 of which drives the toothed portion 81 of the follower 18. The amplitude or extent of the rotation of the wheel 62 thus controls the extent of the rotation of the followers 18 and 19, and, therefore, the length progressed by said wire which passes through the stationary rollers 1 and 2.

Figure 20:
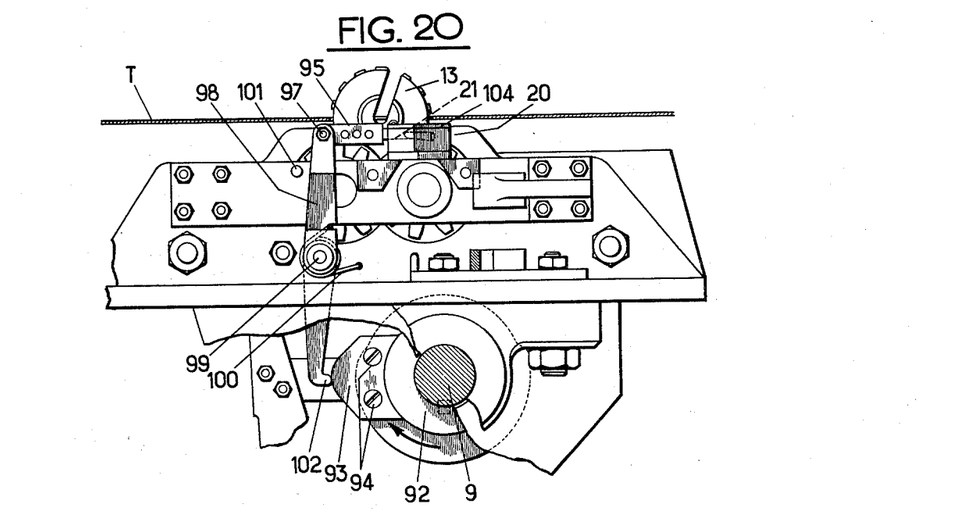
Figure 20 shows, at a larger scale, a partial vertical cross-section with cut-aways of the device utilized in the same machine for severing the fastening wire.
Figure 21:
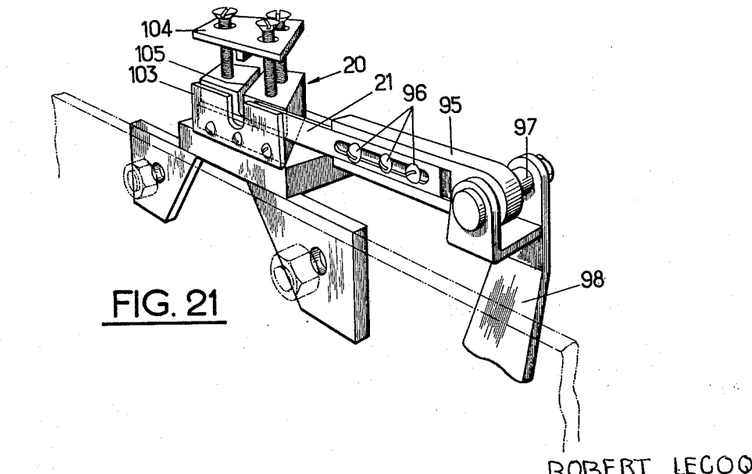
Figure 21 is a partial perspective view, with cut-aways and partly dismounting, of the severing device of Figure 20.

A sleeve 92 (Figure 14) keyed on shaft 9 carries, on one of its lateral faces, a plate 93 acting as a cam for controlling the operation of the severing blade 21; said plate 93 is secured by screws 94 (Figure 20). The blade 21 (Figures 20 and 21) is secured to a blade-carrying plate 95 by means of screws 96 adapted for sliding within a slot provided in said blade. The blade-carrying plate 95 is pivoted by means of a shaft 97 to a lever 98 swingingly mounted on the machine frame by means of a shaft 99. Said lever 98 is under the action of a spring 100, made of a steel wire, so that said lever 98 is urged towards an abutting stud 101. Furthermore, said lever 98 is formed with a nose 102 which engages the peripheral portion of the cam plate 93 when, during the rotation of said plate 93, the latter plate portion passes in front of said nose 102, the motion of said nose 102 causing a swinging motion of the lever 98 which drives the blade-carrying plate 95, and, therefore, the blade 21 with it. The blade 21 is guided behind a plate 103 against a corresponding recess in the aforesaid device 20 provided for guiding the fastening wire. Said blade 21 is held at its top by another plate 104 secured, like the plate 103, by means of screws, to the guiding device 20. 105 is the slot for the passage of the fastening wire. As soon as the nose 102 is no longer in contact with the cam 93, the spring 100 brings the lever 98 back against the abutment 101 and the blade 21 goes out of the slot 105 allowing for the passage of the wire. It is obviously necessary that the cam plate 93 be suitably positioned, so that the severing operation on the wire may occur after the progress of the latter, whatever may be the setting of the cam 70, which controls the stopping of the wire, relatively to the cam 71, which controls the starting of the feeding progress of the fastening wire.

Figure 22:
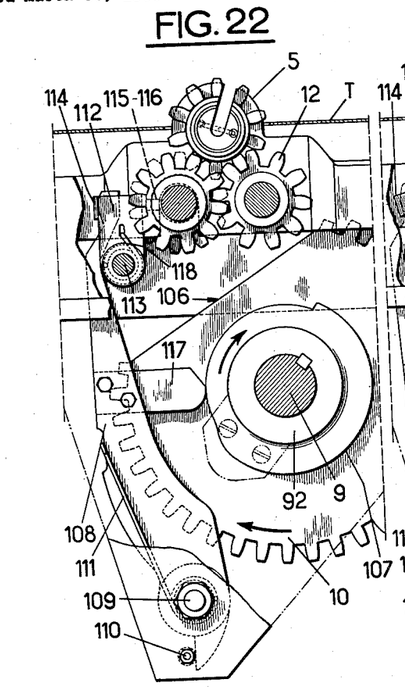
Figures 22 and 23 show, at a larger scale, partial vertical sections, with cut-aways, of the driving device for the rollers which, in the aforesaid machine, perform the torsional action upon the fastening wire.
Figure 23:
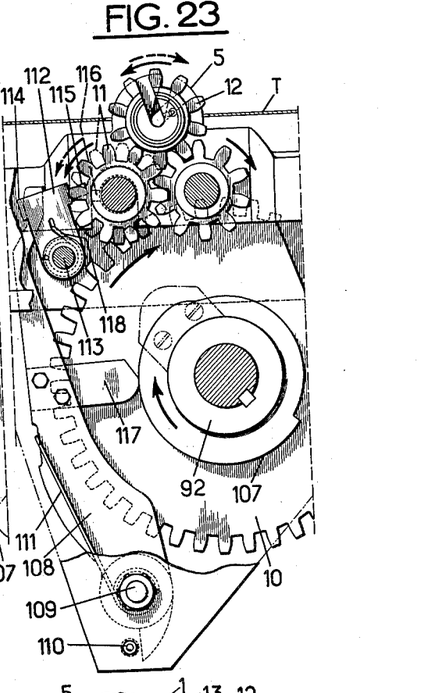
Figure 24:
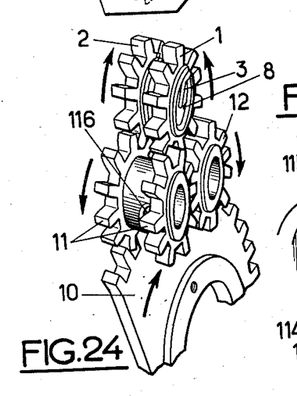
Figure 24 is a partial perspective view, with partial cut-aways, of the roller driving means in the same machine.
Figure 25:
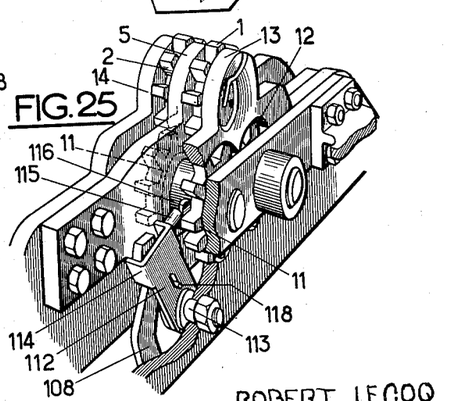
Figure 25 is a partial perspective view of said roller driving means and of the means supporting the latter on the machine.

The mechanism which rotates the rollers 1 and 2, after the severing operation on the wire, comprises a toothed wheel 10 secured, by any suitable means, to the aforesaid sleeve 92. The wheel 10 is incomplete and its toothed portion is limited by a straight section 106 (Figures 22 to 24 inclusive). The wheel 10 is so disposed that it may come into engagement with a first set of teeth of a double pinion 11 having a second set of teeth which is identical to the first set but set-off at an interval equal to half a circular pitch with regard to the latter, said second set of teeth being in engagement with a pinion 12 having the same number of teeth and the same pitch as the pinion 11; on the other hand, said first set of teeth on pinion 11 is in engagement with one of the rollers 1 and 2, while the pinion 12 engages the other roller. Thus, when the main shaft 9 makes one revolution, the wheel 10 rotates the rollers 1 and 2 in opposite directions as long as said wheel 10 is in engagement with the double pinion 11. The number of teeth of the wheel 10 is a whole multiple of the number of teeth of the pinions 11 and 12, so that, during one revolution of the main shaft 9, the rollers 1 and 2 rotate an equal whole number of revolutions. It is, in fact, necessary that, when the machine has come to a stop, the rollers, which immediately before entering into rotation, were facing each other, come back to the same relative position when they come to a stop, by the end of an operating cycle.

According to the invention, a device has been provided for obtaining such stopping of the rollers 1 and 2 in the precise position where the slots of said rollers are exactly facing each other along the direction of their common geometrical axis. In the embodiment shown, by way of illustrative example, in Figures 14 and 22 to 25, said device comprises: a cam portion 107 at the periphery of the sleeve keyed on the main shaft 9; a lever 108 swingingly mounted on a shaft 109 on the machine frame; a stub 110 secured to the machine frame to act as an abutment for the lever 108; a spring 111 urging the lever 108 towards the abutment 110; a pawl 112 swingingly mounted on the machine frame by means of a shaft 113 and comprising a fork member which grasps the upper end of the lever 108; a cylindrical stub member 115 secured on the pawl 112, a hole 116 for receiving said stub 115 being provided on the cylindrical median portion of the double pinion 1; an abutment 117 secured to the lever 108 to bear against the cam portion 107; and, finally, a spring 118 urging the pawl 112 and the stub 115 towards said median portion of the pinion 11.

Figure 22 shows the position of various elements corresponding to the locking position of pinion 11 as a result of the engagement of stub 115 into the aperture 116, such locking position corresponding to the sliding of the abutment 117 against the way portion 107 of smallest radius. When climbing on the way portion of larger radius, said abutment 117 causes the lever 108 to swing, said lever 108 causing the swinging motion of the pawl 12 while disengaging the stub 115 out of the aperture 116. Such latter position corresponds to the beginning of the engagement of the wheel 10 with the pinion 11; a short time before the wheel 10 had ceased to be in engagement with the pinion 11, the abutment 117 had fallen on the cam portion 107 of small radius, the stub 115 is bearing on the middle cylindrical portion of the pinion 11 and said stub falls into the aperture 116 as soon as the wheel 10 ceases its driving motion. A precise stopping position of the rollers 1 and 2 is thereby obtained.

The above description shows that the rotation of the main shaft 9, controlled by the pedal 24, is sufficient to provide a proper timing of all the sequence or cycle of operations required to obtain the mutual fastening of the loops of two given springs.

Figure 26:
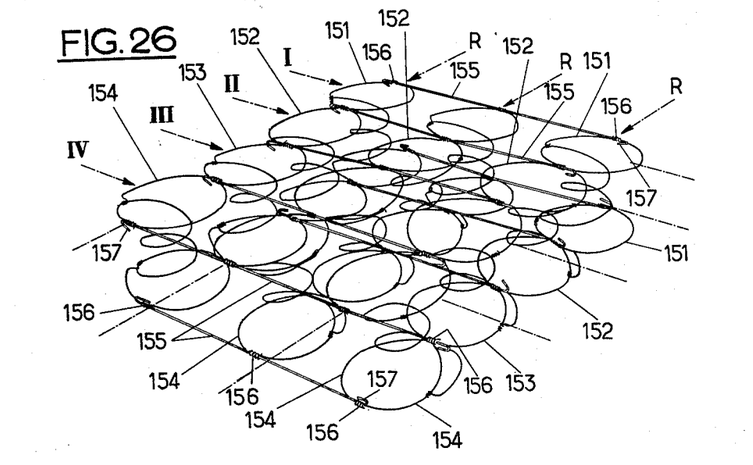
Figure 26 is a perspective view of an elastic frame of rectangular shape manufactured according to the invention.

The flexible frame diagrammatically shown in Figure 26 comprises a set of springs of a helicoidal type in general use in the furniture manufacturing industry. The springs 151, 152, 153 and 154 are so disposed as to form a net of two groups of rows perpendicular to each other: in a first direction, three spaced rows R comprise each four adjacent springs 151, 152, 153 and 154, and, in a second direction perpendicular to said first direction, four adjacent rows with spaced springs in each row, namely: one row I comprising three spaced springs 151, one row II comprising three spaced springs 152, one row III comprising three spaced springs 153 and one row IV comprising three spaced springs 154. In each row I, II, III and IV, rectilinear wires 155 are disposed in tangential relation with the end loops of the springs in each row, respectively; where the wires 155 contact said end loops said wires 155 are fastened to said spring loops by means of fastening wires 156 wound up and tightened on said wires 155 and loops.

Figure 27:
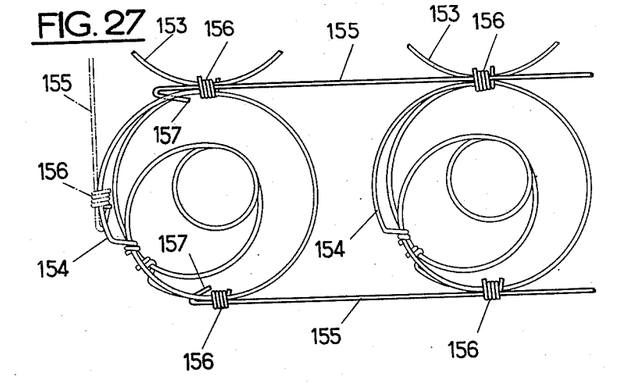
Figure 27 shows, at a larger scale, a top view of the frame of Figure 26, and near a corner of same.
Figure 28:
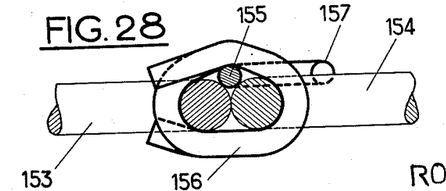
Figure 28 shows a cross-section of the loops of two springs in the proximity of their fastening point.

Figure 27 shows more clearly the fastenings 156 made of weatherproofed wire. Said fastenings 156 join the end loops of adjacent springs 153 and 154; outwardly, the fastenings 156 and the wires 155 maintain the spacing of the end springs 154 and 151, on the opposite side (Figure 26). For providing a less flexible frame, it is also possible to join the springs 151, 152, 153, 154 of the outermost rows R together, by means of a similar wire 155 with fastening 156, as shown in dashed lines in Figure 27. For reasons of greater safety, the fastening wires 156 are bent at their ends 157.

Modifications may obviously, be brought to the machine herein described and illustrated without departing from the scope of the present invention which is more specifically defined in the appended claims.

Besides, with the machine according to the invention, many flexible cushions or similar furniture articles may be manufactured in a great variety of types and shapes by diversely combining the fastening of springs with wires mutually joining said springs.

What I claim is:

1. Means for joining portions of wire members comprising in combination: two rotatable coaxial cylindrical members having the same effective size, and provided individually with a radial slot open at their periphery and extending at the other end beyond the geometrical axis of said coaxial members and with a rectilinear transverse passage inclined on said geometrical axis, said rectilinear transverse passages being adapted to be placed in the same inclined rectilinear alignment for receiving at least one portion of fastening wire when simultaneously said radial slots are facing each other and thereby adapted to receive said fastening wire; means for rotatably supporting said coaxial members; and a driving device adapted to cause said coaxial members to simultaneously rotate equal angles in opposed directions.

2. Machine for joining portions of wire members including means as claimed in claim 1 and further comprising in combination therewith means for feeding said fastening wire into said transverse passages, means for severing a predetermined length of said fastening wire, means for producing a rotative power, sequence timing means for automatically controlling at least one of said feeding means, said severing means and said coaxial member rotating means according to a predetermined sequence, and a clutching device placed under the control of an operator for engaging said rotative power producing means with said sequence timing means.

3. Machine for joining portions of wire members comprising in combination: two rotatable coaxial cylindrical members having the same effective size, and provided individually with a radial slot open at their periphery and extending at the other end beyond the geometrical axis of said coaxial members and with a rectilinear transverse passage inclined on said geometrical axis, said rectilinear transverse passages being adapted to be placed in the same inclined rectilinear alignment for receiving at least one portion of fastening wire when simultaneously said radial slots are facing each other and thereby adapted to receive said fastening wire; means for rotatably supporting said coaxial members; a driving device adapted to cause said coaxial members to simultaneously rotate equal angles in opposed directions, and means for stopping said coaxial member rotating means at the end of the operating cycle when said radial slots and said transverse passages are exactly in alignment, respectively.

4. Means for joining portions of wire members comprising in combination: two rotatable coaxial cylindrical members having the same effective size, and provided individually with a radial slot open at their periphery and extending at the other end beyond the geometrical axis of said coaxial members and with a rectilinear transverse passage inclined on said geometrical axis, said rectilinear transverse passages being adapted to be placed in the same inclined rectilinear alignment for receiving at least one portion of fastening wire when simultaneously said radial slots are facing each other to receive said fastening wire and thereby adapted means for rotatably supporting said coaxial members; a driving device adapted to cause said coaxial members to simultaneously rotate equal angles in opposed directions, and means for adjusting the said portion of fastening wire to a predetermined length.

5. Machine for joining portions of wire members comprising in combination: two rotatable coaxial cylindrical members having the same effective size, and provided individually with a radial slot open at their periphery and extending at the other end beyond the geometrical axis of said coaxial members and with a rectilinear transverse passage inclined on said geometrical axis, said rectilinear transverse passages being adapted to be placed in the same inclined rectilinear alignment for receiving at least one portion of fastening wire when simultaneously said radial slots are facing each other and thereby adapted to receive said fastening wire; means for rotatably supporting said coaxial members; a driving device adapted to cause said coaxial members to simultaneously rotate equal angles in opposed directions, means for stopping said coaxial member rotating means at the end of the operating cycle when said radial slots and said transverse passages are exactly in alignment, respectively; and means for adjusting the said portion of fastening wire to a predetermined length.

6. Machine for joining portions of wire members comprising in combination: two rotatable coaxial cylindrical members having the same effective size, and provided individually with a radial slot open at their periphery and extending at the other end beyond the geometrical axis of said coaxial members and with a rectilinear transverse passage inclined on said geometrical axis, said rectilinear transverse passages being adapted to be placed in the same inclined rectilinear alignment for receiving at least one portion of fastening wire when simultaneously said radial slots are facing each other and thereby adapted to receive said fastening wire; means for rotatably supporting said coaxial members; a driving device adapted to cause said coaxial members to simultaneously rotate equal angles in opposed directions, means for stopping said coaxial member rotating means at the end of the operating cycle when said radial slots and said transverse passages are exactly in alignment, respectively; means for adjusting the said portion of fastening wire to a predetermined length, and an upper table substantially enclosing the moving parts of the machine and providing a bearing surface for the articles to be operated upon.

References Cited in the file of this patent

UNITED STATES PATENTS

| | | |
|---|---|---|
| 2,015,927 | Gilmore | Oct. 1, 1935 |
| 2,059,117 | King | Oct. 27, 1936 |
| 2,119,765 | Zimmerman | June 7, 1938 |
| 2,348,897 | Gladstone | May 16, 1944 |
| 2,480,158 | Owen | Aug. 30, 1949 |
| 2,705,027 | Sanborn | Mar. 29, 1955 |